United States Patent [19]
Asai et al.

[11] Patent Number: 5,272,021
[45] Date of Patent: Dec. 21, 1993

[54] LITHIUM BATTERY

[75] Inventors: Hiroyuki Asai, Chiba; Yoshiharu Matsuda, Yamaguchi; Takashi Nakamura, Chiba; Hiromori Tsutsumi, Yamaguchi, all of Japan

[73] Assignee: Dow Corning Toray Silicone Co., Ltd., Tokyo, Japan

[21] Appl. No.: 920,722

[22] Filed: Jul. 28, 1992

[30] Foreign Application Priority Data

Jul. 29, 1991 [JP] Japan .................. 3-211544

[51] Int. Cl.$^5$ .............................. H01M 6/20
[52] U.S. Cl. ................ 429/192; 429/191; 252/62.2
[58] Field of Search ............... 429/191, 192; 252/62.2

[56] References Cited

U.S. PATENT DOCUMENTS

| | | |
|---|---|---|
| 4,798,773 | 1/1989 | Yasukawa et al. .................. 429/192 |
| 4,882,243 | 11/1989 | Skotheim et al. |
| 5,091,274 | 2/1992 | Hsiue et al. ........................ 429/192 |
| 5,112,512 | 5/1992 | Makamura ..................... 429/192 X |

OTHER PUBLICATIONS

Watanabe et al., Estimation of Li+ Transport Number in Polymer Electrolytes by the Combination of Complex Impedance and Potentiostatic Polarization Measurements, Solid State Ionics, 28-30, (1988), 911-917.

Primary Examiner—Prince Willis, Jr.
Assistant Examiner—M. Nuzzolillo
Attorney, Agent, or Firm—Roger E. Gobrogge

[57] ABSTRACT

The present invention relates to a lithium battery, and, more specifically, to an all-solid-state lithium battery that can generate a stable voltage and current. The novelty herein resides in the use of a solid electrolyte comprising a crosslinked macromolecular copolymer made from a polyoxyalkylene chain-containing polymeric compound and a polyorganosiloxane chain that carries the lithium carboxylate group.

12 Claims, 3 Drawing Sheets

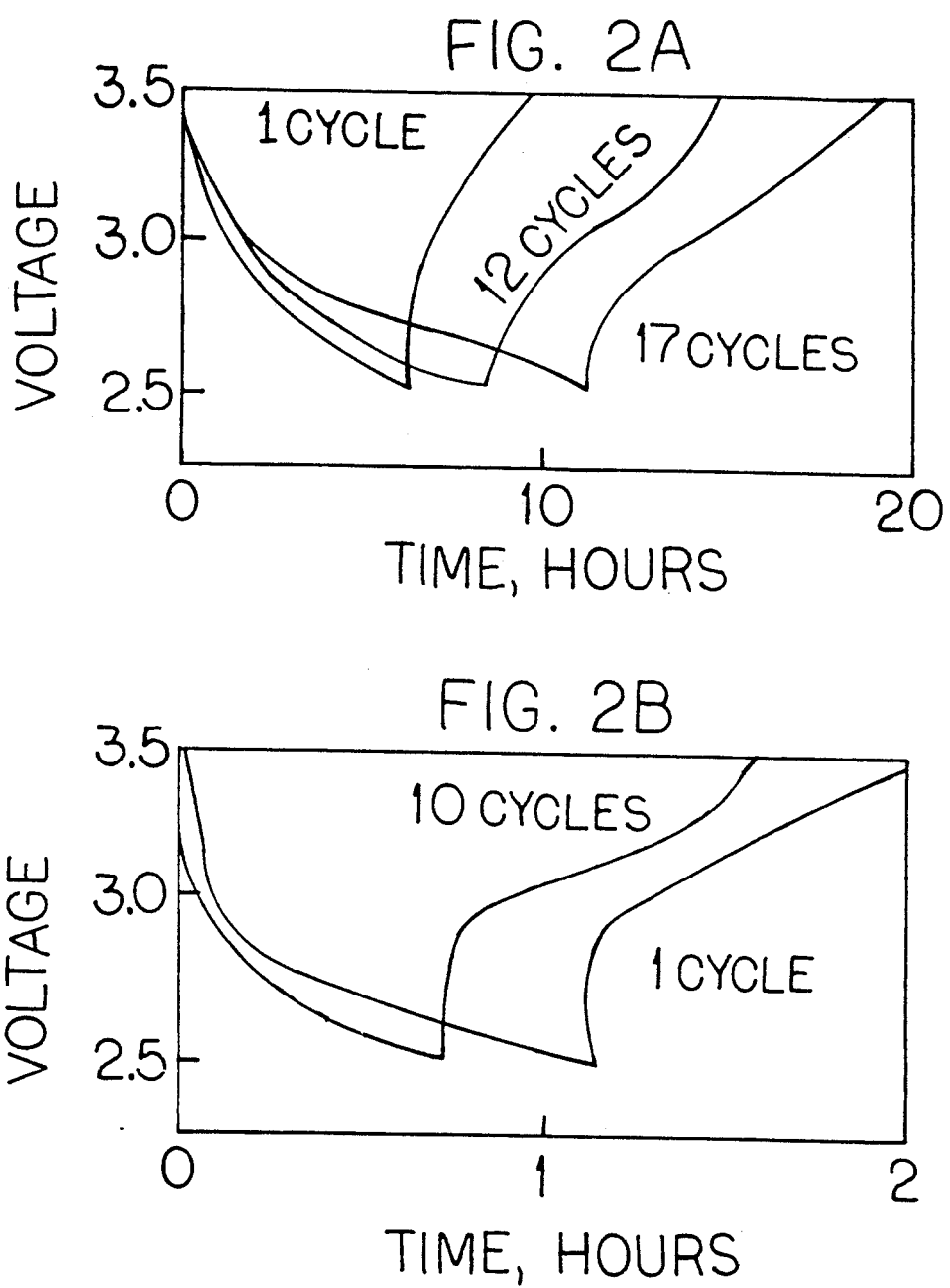

LITHIUM BATTERY

BACKGROUND OF THE INVENTION

The present invention relates to a lithium battery, and, more specifically, to an all-solid-state lithium battery that can generate a stable voltage and current.

Lithium batteries have recently undergone remarkable developments in terms of performance improvements, miniaturization, and thickness reduction. These developments have required improvement not only with respect to the material and shape of the negative and positive electrodes, but also with respect to the intervening electrolyte. In particular, solid electrolytes are considered crucial for obtaining a solid-state product, a high flexibility, and a high degree of moldability. These electrolytes, moreover, must have various high-performance attributes such as a high ionic conductivity, high lithium ion transport number, high reliability, and resistance to moisture.

Solid electrolytes comprising lithium salts dissolved and/or dispersed in polymer resin matrices are known in the art. In particular, the synthesis of solid electrolytes that combine polyorganosiloxane chains with the polyethylene oxide (PEO) chains have been actively pursued. For example, Japanese Patent Application Laid-Open [Kokai or Unexamined] Number 62-209169 [209,169/1987] teaches a solid electrolyte obtained by the dispersion of lithium ions in crosslinked material obtained by crosslinking siloxane and PEO using radiation (electron beam and the like) or the Pt-catalyzed hydrosilylation reaction. Japanese Patent Application Laid-Open Number 63-170857 [170,857/1988] teaches a lithium battery that incorporates this solid electrolyte. These methods, however, require the use of organic solvents which are deemed inappropriate for some products and which complicate their manufacturing processes. For instance, the organic solvent can degrade the working environment, damage surrounding substances and persist in the final product. Similarly, the organic solvent can deter the crosslinking reaction by inducing phase separation. This is associated, inter alia, with a deterioration in product quality and a lack of reproducibility.

Japanese Patent Application Laid-Open Number 2-230667 [230,667/1990] discloses a lithium battery which incorporates a solid electrolyte comprising lithium salt dispersed in PEO chain-grafted polystyrene. Although this method does lead to an improvement in material homogeneity, it is disadvantageous in that negative ion transfer occurs due to electrical conduction simultaneous with positive ion transfer. Such negative ion transfer causes polarization within the electrolyte and variation within the structure of the electrode/electrolyte interface with elapsed time resulting in non-steady-state current flow.

Since compensation for the electrical charge of the positive ion makes the presence of negative ions unavoidable, negative-ion mobility must be minimized as much as possible, i.e., it is desired to have a solid electrolyte whose conduction is based solely on the positive ion (positive ion-monoconductive solid electrolyte). Such electrolytes have been described in the art. For example, Lecture Number 2XIICO8 from the 1988 Annual Spring Meeting of the Chemical Society of Japan describes a lithium ion-monoconductive, sulfonate ion-immobilized solid electrolyte thin film. This film is fabricated by the plasma polymerization of octamethylcyclotetrasiloxane and methyl benzenesulfonate followed by compounding with PEO and treatment with lithium iodide. The complex nature of this plasma polymerization reaction, however, makes production of the target polymer structure highly problematic and, as a result, a perfect lithium ion-monoconductive solid electrolyte is not obtained. Another problem with this method is that the use of plasma polymerization limits this method's range of application.

Thus, even though the lithium batteries proposed to date have incorporated solid electrolytes, they suffer from problems with the properties of the solid electrolytes or with their methods of fabrication.

The present invention takes as its object the production of an all-solid-state lithium battery that generates a stable voltage and current. The present inventors have carried out extensive investigations directed at solving this object and, as a result, discovered that material comprising the dispersion of lithium ion in a particular type of macromolecular crosslinked copolymer is free of the problems listed above and exhibits an excellent ionic conductivity. Moreover, manipulation of the composition makes it possible to obtain a positive ion-monoconductive solid electrolyte material that eliminates the above-listed problems when incorporated into a lithium battery.

SUMMARY OF THE INVENTION

The present invention relates to a lithium battery which comprises a negative electrode whose active material is a lithium metal, a lithium alloy, or lithium-intercalated carbon, a positive electrode, and an interposed electrolyte. The electrolyte of the present invention is characterized in that it is composed of a crosslinked macromolecular copolymer made from a polyoxyalkylene chain-containing polymeric compound and a polyorganosiloxane chain that carries the lithium carboxylate group

bonded to silicon through a hydrocarbon group.

BRIEF DESCRIPTION OF THE DRAWINGS

FIG. 2a reports the time-dependent variations in the voltage of the lithium battery produced in Example 1 during charge/discharge at a constant current (3.77 microA/cm²).

FIG. 2b reports the time-dependent variations in the voltage of Comparison Example 1 during charge/discharge at a constant current (37.7 microA/cm²).

DETAILED DESCRIPTION OF THE INVENTION

Figure 1:
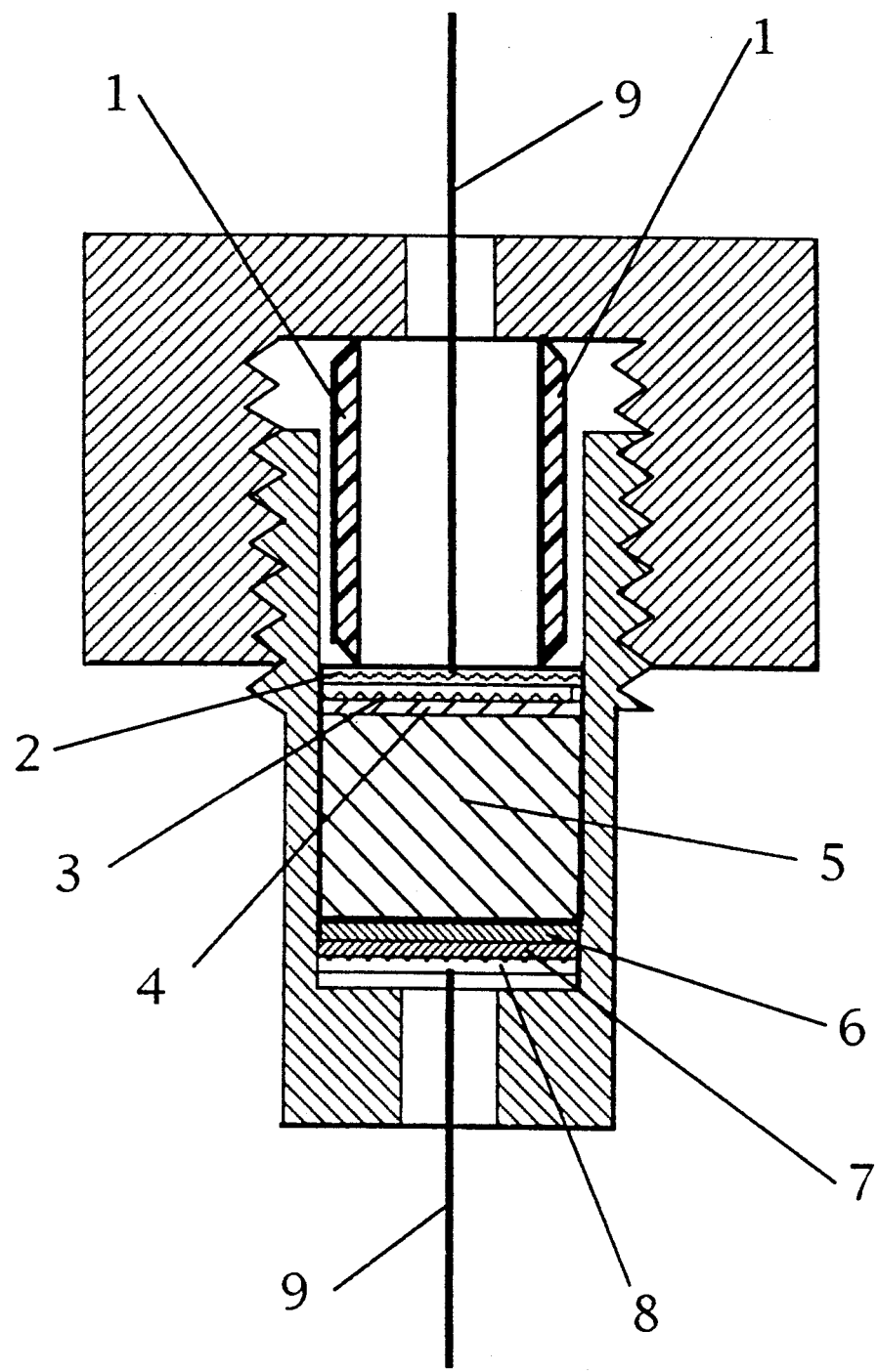
FIG. 1 presents the cross section of a lithium battery according to the present invention.

The present invention is based on the unexpected discovery that batteries containing the solid electrolytes described herein generate stable voltage and current. These batteries can be either all-solid-state primary batteries or all-solid-state secondary (chargeable/dischargeable) batteries. The main difference between these batteries is the type of active substance at the positive electrode as discussed below.

The configuration of the batteries herein comprises a so-called rocking chair structure regardless of whether it is a primary or secondary battery. In this configuration the cell reactions at both the positive and negative electrodes should be mediated only by the lithium ion, i.e., a negative electrode/solid electrolyte/positive electrode sandwich structure. The size, thickness, and shape of the battery are not specifically restricted, and will typically vary over a wide range from paper-shaped (area=several cm$^2$, thickness=approximately 1 mm) to coin-shaped to a spiral cylinder.

While lithium metal foil is typically used for the negative electrode, the negative electrode is not specifically restricted as long as it comprises an electrically conductive sheet that provides lithium metal (=negative electrode active substance) in a form effective for the electrode reaction. The negative electrode is exemplified by lithium/aluminum alloy and lithium supported in a carbon sheet.

Similarly, the active substance of the positive electrode is also not specifically restricted as long as it is of a type in which lithium ion is intercalated or inserted during discharge and desorbed during charging of a secondary battery. Inorganic layer compounds are, however, typically employed. Examples include manganese dioxide, vanadium oxide, titanium disulfide, cobalt oxide, nickel oxide, molybdenum sulfide, and their composites. As these compounds are typically brittle and poorly electrically conductive, they may be formulated as a sheet through the use of an organic resin binder and supplemented with, for example, carbon particles as a conductivity donor. The use of layer compounds whose structure has partially taken up the lithium ion is preferred for secondary batteries in order to avoid variation in the layer structure during the charge/discharge cycle and to support adsorption/desorption of the lithium ion.

With regard to the crosslinked macromolecular copolymer as specified hereinbefore, the essential feature of this crosslinked material is that it is made from a polyoxyalkylene chain-containing polymeric compound and a polyorganosiloxane chain that contains the lithium carboxylate group with the chemical structure $$-COO^- Li^+$$

bonded to silicon through a hydrocarbon group. Said hydrocarbon group is exemplified by C$_{1-8}$ alkylene groups such as methylene, ethylene, propylene, butylene, pentylene, hexylene, heptylene, and octylene, and by C$_{8-20}$ arylene groups such as phenylene and naphthylene. The type, morphology, and crosslink density of this macromolecular compound are not otherwise specifically restricted.

In the solid electrolyte according to the present invention as described hereinbefore, the anion-containing group ($-COO^-$) is bonded to silicon across a hydrocarbon group, with the result that the mobility of the anion is extremely low. Accordingly, in the crosslinked macromolecular copolymer under consideration, ionic conductivity is generated by dissociation of the lithium ion from the negative ion and movement of the lithium ion. When this $-COO^-$ is the only anion present within the crosslinked macromolecular copolymer, the solid electrolyte then functions exclusively as a lithium ion-mediated conductor.

The following method is a preferred method for the preparation of the solid electrolyte under consideration. It comprises curing a mixture of the following components through a dehydration condensation reaction:

(A) a polyorganosiloxane having at least 2 carboxyl-containing hydrocarbon groups in each molecule, (B) a polyoxyalkylene chain-containing polymeric compound that has at least 2 hydroxyl groups in each molecule, and (C) a lithium atom-containing alkali compound.

The polyorganosiloxane component (A) must have at least 2 carboxyl-containing hydrocarbon groups in each molecule in order to form the crosslinked macromolecular copolymer. In addition, it is preferred that the following ratio have values within the range of 0.01 to 100:

$$\frac{\text{siloxane units carrying a carboxyl-containing hydrocarbon group}}{\text{other siloxane units}}$$

The molecular structure of this component may be any of straight chain, branched, cyclic, network, and three-dimensional. It is, however, preferred that at least half be straight chain or branched in order to facilitate formation of the crosslinked macromolecular copolymer.

Moreover, while the molecular weight is not specifically restricted, it preferably falls within the range of 100 to 1 million in order to support facile production and in order to generate a suitable hardness for the crosslinked macromolecular copolymer. The carboxyl-containing hydrocarbon group in component (A) is exemplified by groups with the general formula $$HOOC-R^1-$$

wherein R$^1$ is C$_{1-8}$ alkylene such as methylene, ethylene, propylene, butylene, pentylene, hexylene, heptylene, or octylene, or C$_{6-20}$ arylene such as phenylene or naphthylene. Of these, carboxyalkyl groups are preferred with the carboxypropyl groups being particularly preferred.

Other than these carboxyl-containing hydrocarbon groups, the organic groups in component (A) are exemplified by alkyl groups such as methyl, ethyl, and propyl; aryl groups such as phenyl, tolyl, and xylyl; and aralkyl groups such as benzyl and phenethyl. The silicon-bonded groups may also include small quantities of hydrogen atoms and alkoxy groups. It is preferred that methyl comprise at least half of the silicon-bonded organic groups from the standpoints of economic efficiency and the formation of a desirable crosslinked macromolecular copolymer. The polyorganosiloxane under consideration is exemplified by trimethylsiloxy-terminated methyl(carboxypropyl)siloxane-dimethylsiloxane copolymers and trimethylsiloxy-terminated methyl(carboxypropyl)siloxane-methylphenylsiloxane copolymers.

Various methods are known for the synthesis of this type of polyorganosiloxane. In one such method, cyano-containing organodichlorosilane and cyano-free organodichlorosilane are cohydrolyzed to afford a cyclic, which is then stirred in aqueous sulfuric acid with an end-stopping agent in order to bring about both ringopening polymerization and conversion of the cyano group into the carboxyl group.

The polymeric compound comprising component (B) is a crosslinker for the aforementioned component (A), and it must contain at least 2 hydroxyl groups in each molecule in order to function as a crosslinker. Since it is preferred that the crosslinked macromolecular copolymer contain the polyoxyalkylene chain in order to achieve a high ionic conductivity, the structure of the polymeric compound comprising component (B) must then contain the polyoxyalkylene chain.

Mutual miscibility between component (A) and component (B) not only makes it possible to avoid the use of a solvent in the process, but is also crucial for bringing the crosslinking reaction to completion and achieving good reproducibility in the structure and physical properties of the crosslinked product. In order to support miscibility with component (A), the molecular and chemical structure of component (B) preferably contains the siloxane unit, and, in order to support the facile formation of the macromolecular crosslinked copolymer, polyorganosiloxanes that contains at least two OH-terminated polyoxyalkylene graft chains, as represented by the following general formula, are preferred:

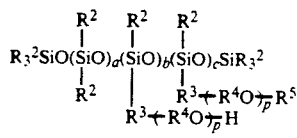

wherein $R^2$ is a monovalent organic group, $R^3$ is a divalent organic group, $R^4$ is an alkylene group, $R^5$ is a monovalent organic group, a and c are integers with values of 0 to 1,000, b is an integer with a value of 2 to 1,000, and p is an integer with a value of 2 to 100. The $R_2$ groups in the preceding formula for the organopolysiloxane under consideration are exemplified by alkyl groups such as methyl, ethyl, and propyl; aryl groups such as phenyl, tolyl, and xylyl; and aralkyl groups such as benzyl and phenethyl. The groups $R^2$ may include small quantities of hydrogen and alkoxy. Methyl preferably comprises at least half of the $R_2$ groups from the standpoints of economic efficiency and the formation of a desirable macromolecular crosslinked copolymer. The $R_3$ groups comprise divalent organic groups such as $C_{1-8}$ alkylene groups like methylene, ethylene, propylene, butylene, pentylene, hexylene, heptylene, and octylene, and arylene groups like phenylene and naphthylene. The $R_4$ group is an alkylene group such as methylene, ethylene, propylene, butylene, pentylene, hexylene, and heptylene group. The $R_5$ group is an alkyl group such as methyl, ethyl, or propyl, or an acyl group such as acetyl or propionyl. The subscripts a and c have values within the range of 0 to 1,000, and the subscript b has a value in the range of 2 to 1,000. Although the values of these subscripts are not specifically restricted, the ratio $a/(b+c)$ preferably falls within the range of (1:5) to (5:1) in order to obtain miscibility between components (A) and (B).

Various methods are known for the synthesis of such graft copolymers. In one method provided as exemplary in this regard, polyorganosiloxane bearing hydrogen as a portion of its side chains is hydrosilylation-grafted with specified proportions of (a) a polyoxyalkylene carrying an unsaturated hydrocarbon group at one terminal and acyloxy at the other terminal and (b) a polyoxyalkylene carrying an unsaturated hydrocarbon group at one terminal and trimethylsilyl at the other terminal. The trimethylsilyl at the graft terminals is then selectively converted to hydroxyl using excess alcohol.

While component (B) comprises a polymeric compound as described hereinbefore that contains at least 2 hydroxyl groups in each molecule and whose structure contains the polyoxyalkylene chain, it is advantageous in the face of requirements for higher ionic conductivities that this polymeric compound include hydroxyl-diterminated polyoxyalkylene with the general formula

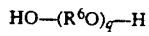

wherein $R^6$ is an alkylene and q is an integer with a value of 1 to 100 or hydroxyl-monoterminated polyoxyalkylene with the general formula

wherein $R^7$ is an alkylene, $R^8$ is a monovalent organic group, and r is an integer with a value of 1 to 100. The groups $R^6$ and $R^7$ in the preceding polyoxyalkylene formulas comprise alkylene groups such as methylene, ethylene, propylene, butylene, pentylene, hexylene, and heptylene. $R^8$ is an alkyl group such as methyl, ethyl, or propyl, or an acyl group such acetyl or propionyl. The subscripts q and r fall within the range of 1 to 100 and preferably fall within the range of 5 to 20.

By condensation-reacting with the component (A) described hereinbefore, the aforesaid hydroxyl-diterminated polyoxyalkylene and hydroxyl-monoterminated polyoxyalkylene function to increase the content of crosslinking and graft polyoxyalkylene chains, respectively, in the macromolecular crosslinked copolymer. Crosslinking and graft polyoxyalkylene chains can be formed in the present invention by the polyoxyalkylene chains of the polymeric compound even in the absence of the crosslinking and graft chains under consideration. However, since the quantity of introduction of polyoxyalkylene chains in the polymeric compound is limited by the condition for miscibility between components (A) and (B), component (B) preferably contains hydroxyl-diterminated polyoxyalkylene or hydroxyl-monoterminated polyoxyalkylene. The ionic conductivity tends to show improvement when the crosslinked macromolecular copolymer according to the present invention contains moderate quantities of graft polyoxyalkylene chains.

Component (C) is a lithium atom-containing alkali compound. While the type of lithium-containing alkali compound is not specifically restricted, the hydroxide, alcoholates, and hydride are preferred. The use of the hydroxide, i.e., lithium hydroxide (LiOH), is particularly preferred.

This component (C) exercises a catalytic effect in the esterification reaction between components (A) and (B) while at the same time ultimately participating in the lithium-carboxylation of the carboxyl groups in component (A) through dehydration. As a result, the crosslinked macromolecular copolymer has a morphology in which the negative ions (carboxylate ion) are immobilized on the siloxane polymer chain and the positive counterions (lithium ion) are dispersed.

With respect to the quantity of dispersion, the ratio [Li+]/[RO] (ratio of the number of moles of lithium ion [Li+] to the number of moles of oxyalkylene groups [RO] in the crosslinked macromolecular copolymer)

preferably assumes values of 0.005 to 0.25 and more preferably 0.02 to 0.1. When this ratio exceeds 0.25, the crosslinked macromolecular copolymer undergoes an increase in polarity and a deterioration in segment mobility. When this ratio falls below 0.005, the development of a high ionic conductivity becomes problematic due to a decline in the number of carriers.

The following ratio $$\frac{\text{number of moles of carboxyl groups in component } (A)}{\text{number of moles of hydroxyl groups in component } (B) + \text{equivalents of alkali in component } (C)}$$

should fall within the range of (1:10) to (10:1) and preferably falls within the range of (1.0:1.2) to (1.2:1.0). Components (A) through (C) can undergo the esterification reaction at any ratio to afford a solidified crosslinked macromolecular copolymer, however, residual unreacted carboxyl group or hydroxyl group will remain in the solid electrolyte when the sum of the number of moles of hydroxyl groups in component (B) plus equivalents of alkali in component (C) differs substantially from the number of moles of carboxyl groups in component (A). When such a solid electrolyte is incorporated into a battery, it can cause such problems as, for example, reaction with the electrode material. When this molar ratio has a value of 1, the resulting solid electrolyte will be an exclusively lithium ion-monoconductive conductor since the positive ion will consist of only lithium ion and the negative ion will consist of only immobilized carboxylate ion.

In the method under consideration, the crosslinked macromolecular copolymer is formed by curing the mixture of components (A) through (C) through a dehydration condensation reaction. This crosslinked product is formed primarily by an esterification reaction between the carboxyl groups in component (A) and the hydroxyl groups in component (B). The reaction techniques employed here comprise those reaction techniques known in the art for the reaction of the carboxyl group with the hydroxyl group such as running the reaction at room or elevated temperature in the presence of an esterification-reaction catalyst such as alkali or the like.

Heating accelerates the esterification reaction while at the same time serves as an effective technical means for removing the water generated as by-product in the esterification reaction. The heating temperature generally will not exceed 150C.

Moreover, this crosslinking reaction can be run in the absence of solvent. Component (A) can be easily mixed with component (B) to homogeneity by such means as stirring. Since component (C) is solvated by the oxyalkylene chains, it can be dissolved in component (B) in advance, or alternately it can be added after mixing components (A) and (B). Solvation of component (C) by the oxyalkylene chains can be brought about by such techniques as stirring. However, techniques such as heating or exposure to ultrasound, or the addition of a small quantity of water, are effective for shortening the dissolution time.

When the use of organic solvent in the dissolution process can be tolerated, components (A) to (C) are mixed and dissolved in the organic solvent and the solvent is then evaporated off. The type of organic solvent is not specifically restricted, and the organic solvent is exemplified by tetrahydrofuran, dioxane, acetonitrile, dimethylformamide, and dimethyl sulfoxide.

Since this esterification reaction produces water as by-product, it will be advantageous to hold the mixture of components (A) to (C) under reduced pressure as a final step. For example, in a recommended method, the esterification reaction is developed to a certain extent at elevated temperature under ambient pressure and heating is then continued in vacuo in order both to remove the water product and bring the esterification reaction to completion. However, when a solvent has been used in the dissolution step, the esterification reaction is first developed to some particular extent at ambient pressure at a temperature not exceeding the organic solvent's boiling point, and heating in vacuo is subsequently conducted only after having evaporated the organic solvent off.

The lithium battery according to the present invention comprises an assembly of the positive electrode, negative electrode, and solid electrolyte as described hereinbefore, but the fabrication method as such is not specifically restricted. Thus, fabrication of the 3 components separately and then their assembly would be sufficient. However, since the battery efficiency is generally raised by increasing the interfacial contact surfaces, a recommended method comprises casting the mixture of solid electrolyte starting materials on the positive electrode, running the crosslinking reaction to form a film, and than affixing the negative electrode thereto. Because the negative electrode and solid electrolyte are degraded by water, battery fabrication must be executed in dry air or preferably in an inert gas atmosphere, e.g., of argon.

The present invention is explained in greater detail below through illustrative examples.

The ionic conductivity of the solid electrolyte was measured by the following method:

The solid electrolyte was first formed into a film that was designated as the measurement sample. The sample's thickness was measured with a micrometer, and platinum electrodes (circular plates, 1 cm in diameter) were bonded on both surfaces of the sample. The entire assembly was set in a thermostatted vacuum chamber, which was pumped down to a high vacuum ($\leq 10^{-5}$ torr). After complete equilibration, an alternating-current voltage of 5 Hz to 13 MHz was applied from an LCR meter (4192A from Yokogawa-Hewlett Packard Co., Ltd.), and the conductivity was measured by the complex impedance method.

EXAMPLE 1

Solid electrolytes were prepared in the form of solid electrolyte according to the present invention (Sample 1), and, for the purposes of property comparison, solid electrolyte from the prior art (Sample 2).

Sample 1

0.384 Grams compound (1), 0.450 g compound (2), and 0.167 g compound (3) as defined below were stirred with 12.2 mg lithium hydroxide and 0.16 g water. Thorough dissolution was achieved by treatment with ultrasound. This solution was poured into a 3 cm-square Teflon TM dish, heated on a hot plate at 120C for 2 hours, and then dried in a vacuum drier at 140C in vacuo for 4 days to afford a transparent, 0.3 mm-thick film. When the infrared absorption spectrum of this film was taken, the peaks originating from the hydroxyl group and free carboxylic acid were not observed, the stretching vibration peak for the carbonyl group generated by ester synthesis was observed at 1,740 cm$^{-1}$, and the asymmetric stretching vibration peak for carboxylate ion was observed at 1,600 cm$^{-1}$. Thus, the esterification reaction had run essentially to completion. The ionic conductivity of this film was measured at $2.0 \times 10^{-7}$ S·cm$^{-1}$ at 25C

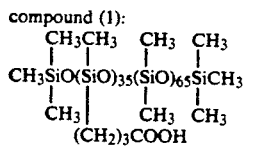

compound (1):

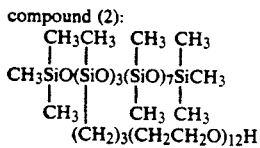

compound (2):

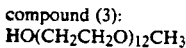

compound (3):
HO(CH$_2$CH$_2$O)$_{12}$CH$_3$

Sample 2

0.278 Grams compound (1), 0.527 g compound (2), and 0.195 g compound (3) (refer to Sample 1) were stirred with 30.8 mg lithium perchlorate, and complete dissolution was achieved by treatment with ultrasound. After the addition of 3 microliters 0.1N ethanolic hydrochloric acid, a thermal drying treatment was conducted as for Sample 1 to afford a transparent, 0.3 mm-thick film. When the infrared absorption spectrum of this film was taken, the peaks originating from the hydroxyl group and free carboxylic acid were not observed and the stretching vibration peak for the carbonyl group generated by ester synthesis was observed at 1,740 cm$^{-1}$. Thus, the esterification reaction had run essentially to completion. The ionic conductivity of this film was measured at $4.8 \times 10^{-5}$ S·cm$^{-1}$ (25C).

Direct-current voltage impression test

Lithium foil (diameter=1 cm, thickness=0.14 mm) was bonded on both surfaces of Sample 1 and Sample 2 (thickness=0.3 mm). In each case, the entire assembly was set in a vacuum chamber, which was then pumped down to a high vacuum ($\leq 10^{-5}$ torr at 25C). After the sample was fully equilibrated, a direct-current voltage of 1V was impressed across the two lithium foils, and the time-dependent variation in current flow was measured. For Sample 1, the initial current of 5.2 microA continued for approximately 2 days, confirming this ionically conductive material to be a positive ion-monoconductive material. For Sample 2, the initial current of 79 microA declined to 4.4 microA over 2 days.

Lithium batteries were then fabricated using Sample 1 and 2 as solid electrolytes. A lithium/manganese composite oxide for use as the positive electrode material was prepared by the method described elsewhere by Nohma, et al. (Sanyo Technical Review, 20, 114 (1989)). Thus, 0.118 g lithium hydroxide was thoroughly mixed with 1 g chemically synthesized manganese dioxide. Heating at 375C in air for 20 hours then gave the target material. In order to mold the electrode, 30 mg of this lithium/manganese composite oxide was combined with 20 mg acetylene black (conductive agent) and 5 mg Teflon TM (binder) followed by press molding. FIG. 1 reports the cross section of the battery fabricated using this positive electrode.

The particular lithium battery (containing Sample 1 or 2) was subjected to charge/discharge cycle testing, which was conducted at a constant current (3.77 or 37.7 microA/cm$^2$). The upper voltage limit for charging was 3.5 V and the lower voltage limit for discharging was 2.5 V.

Figure 3A:
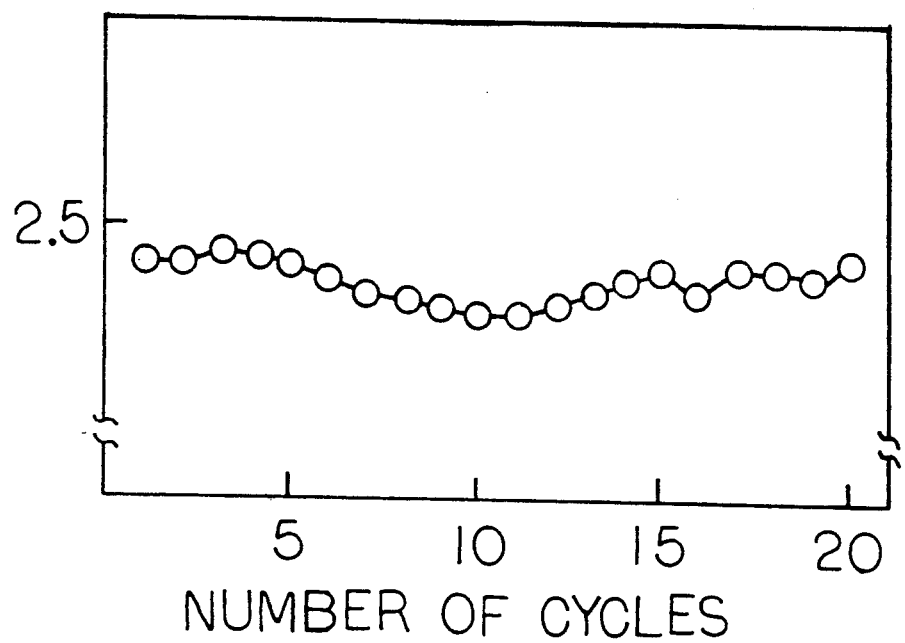
FIG. 3a reports the cycle-to-cycle variation in the discharge capacity of the lithium battery fabricated in Example 1 at a constant current (3.77 microA/cm²).
Figure 3B:
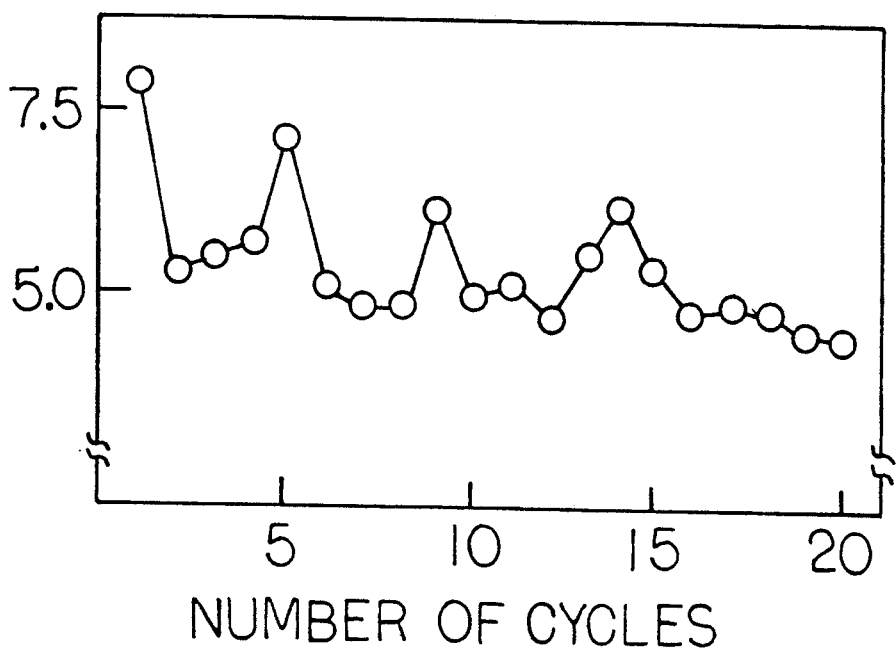
FIG. 3b reports the cycle-to-cycle variation in the discharge capacity of the lithium battery fabricated in Comparison Example 1 at a constant current (37.7 microA/cm²).

FIG. 2 reports the voltage-versus-time curves for typical cycles. Battery (a) contained the Sample 1 that was prepared according to the present invention. Not only was battery (a) almost completely free of the decline in efficiency associated with repetitive charge/discharging, but in fact its efficiency improved. Battery (b) (Comparison Example 1) contained the Sample 2 that had been prepared in accordance with the prior art, and this battery suffered from a decline in efficiency due to repetitive charge/discharging. FIG. 3 reports the cycle-to-cycle change in the discharge capacity. For battery (a) containing Sample 1, the discharge capacity underwent little cycle-to-cycle variation and was stable. On the other hand, battery (b) (Comparison Example 1) containing Sample 2 lacked stability and its discharge capacity gradually declined.

EXAMPLE 2

Ten grams compound (4) (see below) was dissolved in approximately 500 mL toluene/n-butyl alcohol (1/1) mixed solvent. 76.42 mg lithium hydroxide was then added with thorough stirring, thus completely converting the carboxyl groups in compound (4) to lithium carboxylate. The solvent was completely removed, and 0.772 g of the resulting oil was stirred with 0.154 g compound (5) and 0.074 g compound (6) (see below). Complete dissolution was achieved by treatment with ultrasound. To this mixture was added approximately 20 mg (4-isopropyl)phenyl 1-hydroxyisopropyl ketone as photosensitizer. The mixture was then poured into a 3 cm-square Teflon TM dish and irradiated for 6 seconds directly from above with 160 W/cm ultraviolet radiation from a high-tension mercury lamp residing at a distance of 5 cm. The product was a transparent, 0.3 mm-thick film. After drying at 70C in vacuo for 2 days, its ionic conductivity was measured. A value of $1.6 \times 10^{-7}$ S·cm$^{-1}$ was obtained at 25C. This film was subjected to the same direct-current voltage impression test as in Example 1: a current of 4.7 microA continued for approximately 2 days. In addition, a lithium battery was fabricated as in Example 1: the initial discharge capacity was 2.5 mAh/g, and the discharge capacity was 2.3 mAh/g at the 20th cycle.

compound (4):

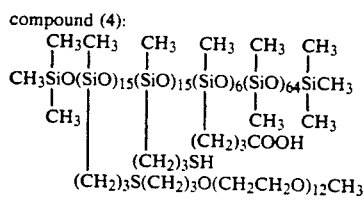

compound (5):

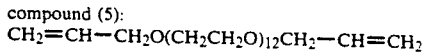

compound (6):

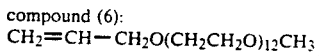

EXAMPLE 3

Ten grams compound (7) (see below) was dissolved in approximately 500 mL toluene/n-butyl alcohol (1/1)

mixed solvent, and 86.67 mg lithium hydroxide was added with thorough stirring in order to completely convert the carboxyl groups in compound (7) to lithium carboxylate. The solvent was completely removed, and 0.749 g of the resulting oil was stirred with 0.170 g compound (5) and 0.081 g compound (6) (see Example 1). Complete dissolution was achieved by treatment with ultrasound. To this mixture was added 2.47 microliters 2 weight % isopropanolic chloroplatinic acid hexahydrate ($H_2PtCl_6 \cdot 6H_2O$) solution as hydrosilylation catalyst. It was then poured into a 3 cm-square Teflon TM dish and heated in an oven held at 70C for 2 hours to afford a transparent, 0.3 mm-thick film. After drying in vacuo at 70 C. for 2 days, the ionic conductivity was measured at $1.8 \times 10^{-7}$ S·cm$^{-1}$ (25C). A direct-current voltage impression test was conducted as in Example 1: a current of 4.9 microA continued for approximately 2 days. A lithium battery was fabricated as in Example 1: the discharge capacity was initially 3.5 mAh/g and was 2.9 mAh/g at the 20th cycle.

compound (7):

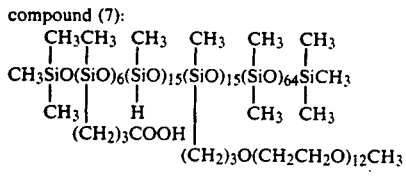

That which is claimed is:

1. In a lithium battery comprising a negative electrode whose active material is lithium metal, lithium alloy, or lithium-intercalated carbon, a positive electrode, and an interposed electrolyte, the lithium battery is characterized in that the electrolyte comprises a crosslinked macromolecular copolymer made from polyoxyalkylene chain-containing polymeric compound and polyorganosiloxane chain that carries the lithium carboxylate group COO$^-$Li$^+$ bonded to silicon through a hydrocarbon group.

2. The lithium battery according to claim 1 wherein the crosslinked macromolecular copolymer is prepared by curing a mixture of the following components through a dehydration condensation reaction:

(A) polyorganosiloxane having at least 2 carboxyl-containing hydrocarbon groups in each molecule, (B) polyoxyalkylene chain-containing polymeric compound that has at least 2 hydroxyl groups in each molecule, and (C) Lithium atom-containing alkali compound.

3. The lithium battery according to claim 2 wherein the ratio of siloxane units carrying a carboxyl-containing hydrocarbon group to other siloxane units in the polyorganosiloxane is in the range of 0.01 to 100.

4. The lithium battery of claim 2 wherein at least half of the polyorganosiloxane is straight chain or branched.

5. The lithium battery of claim 2 wherein the carboxyl-containing hydrocarbon group has the general formula

HOOC—R$^1$— wherein R$^1$ is selected from the group consisting of C$_{1-8}$ alkylene and C$_{6-20}$ arylene.

6. The lithium battery according to claim 2 wherein the molecular weight of the polyorganosiloxane is in the range of 100 to one million.

7. The lithium battery according to claim 2 wherein the polyoxyalkylene chain-containing polymeric compound comprises a polyorganosiloxane that contains at least two OH-terminated polyoxyalkylene graft chains.

8. The lithium battery according to claim 2 wherein the polyoxyalkylene chain-containing polymeric compound includes compounds selected from the group consisting of hydroxyl-diterminated polyoxyalkylenes of the structure HO—(R$^6$O)$_q$—H and hydroxyl-monoterminated polyoxyalkylene of the structure HO—(R$^7$O)$_q$— R$^8$, wherein R$^6$ is an alkylene, q is an integer with a value of 1 to 100, R$^7$ is an alkylene, and R$^8$ is a monovalent organic group.

9. The lithium battery according to claim 2 wherein the lithium atom-containing alkali compound is selected from the group consisting of lithium hydroxide, lithium hydride and lithium alcoholate.

10. The lithium battery according to claim 2 wherein the ratio of the number of moles of lithium ion to the number of moles of oxyalkylene groups in the crosslinked macromolecular copolymer is in the range of 0.005 to 0.25.

11. The lithium battery according to claim 1 wherein the positive electrode is of a type in which the lithium ion is intercalated or inserted during discharge and desorbed during charging of a secondary battery.

12. The lithium battery according to claim 1 wherein the positive electrode comprises an inorganic layer compound.

* * * * *